US012436928B2

(12) United States Patent
Floyd et al.

(10) Patent No.: US 12,436,928 B2
(45) Date of Patent: *Oct. 7, 2025

(54) SYSTEMS AND METHOD OF MANAGING DOCUMENTS

(71) Applicant: The Toronto-Dominion Bank, Toronto (CA)

(72) Inventors: James Frederick Floyd, Toronto (CA); Aaron Jonathan Cheddie, Toronto (CA); Raymond Pan, Toronto (CA); Kimberly Blair Snow, Toronto (CA); Nan Li, Toronto (CA); Ashkan Alavi-Harati, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,747

(22) Filed: May 14, 2024

(65) Prior Publication Data

US 2024/0296150 A1    Sep. 5, 2024

Related U.S. Application Data

(63) Continuation of application No. 16/293,721, filed on Mar. 6, 2019, now Pat. No. 12,019,594.

(51) Int. Cl.
*G06F 16/215* (2019.01)
*G06F 16/23* (2019.01)
*G06F 16/93* (2019.01)

(52) U.S. Cl.
CPC ........ *G06F 16/215* (2019.01); *G06F 16/2365* (2019.01); *G06F 16/93* (2019.01)

(58) Field of Classification Search
CPC ..... G06F 16/215; G06F 16/93; G06F 16/2365
See application file for complete search history.

(56) References Cited

U.S. PATENT DOCUMENTS

| | | | |
|---|---|---|---|
| 5,093,787 A | * | 3/1992 | Simmons ........... G06Q 20/0425 708/106 |
| 6,021,202 A | | 2/2000 | Anderson |
| | | | (Continued) |

OTHER PUBLICATIONS

Jain et al., EP 3 509 026 A1, Application No. 19150234.3, Date of filing: Mar. 1, 2019. (Year: 2019).*

(Continued)

*Primary Examiner* — Mohsen Almani
(74) *Attorney, Agent, or Firm* — Rowand LLP

(57) ABSTRACT

Systems and methods of managing documents associated with resources. The system includes a communication module, a processor, and a memory. The memory stores duplicate detection data and instructions that, when executed, configure the processor to: receive, via the communication module and from a client device, an image of the subject document; extract a document identifier from the image of the subject document; obtain a date associated with the subject document; determine that the subject document is unique by comparing a set of validation data values with the duplicate detection data; and in response to determining that the subject document is unique, transmit, to the client device, a provisional acceptance notification and provisionally allocate the resource associated with the subject document to a data record corresponding to a second identifier. Extracting the date from the image of the subject document may include using image recognition.

20 Claims, 8 Drawing Sheets

(56) References Cited

U.S. PATENT DOCUMENTS

| | | | |
|---|---|---|---|
| 7,257,246 | B1 | 8/2007 | Brodie |
| 9,218,701 | B2 | 12/2015 | Cantley et al. |
| 9,679,431 | B2 | 6/2017 | Williams |
| 2004/0054685 | A1* | 3/2004 | Rahn ................ G06Q 40/08 707/999.102 |
| 2005/0273452 | A1* | 12/2005 | Molloy ............. G06F 16/284 |
| 2010/0161466 | A1 | 6/2010 | Gilder |
| 2011/0071934 | A1 | 3/2011 | Brown |
| 2013/0110724 | A1 | 5/2013 | Edwards |
| 2015/0117747 | A1 | 4/2015 | Smith |
| 2015/0117748 | A1 | 4/2015 | Smith |
| 2016/0012445 | A1* | 1/2016 | Villa-Real ........ G06Q 20/4016 705/44 |
| 2018/0239959 | A1* | 8/2018 | Bui .................... G06F 16/93 |
| 2019/0213822 | A1 | 7/2019 | Jain |

OTHER PUBLICATIONS

Hassanein, Khaled. "Image Data Mining of Check Transactions in Support of Customer Relationship Management at Banks." Journal of Information Technology Cases and Applications: JITCA; Marietta vol. 4, Iss. 4, (2002): 4-21. (Year: 2002).*

Higgins: "Ramifications of MICR Mismatch in Check Image Exchange", dated Jan. 2008, retrieved from http://www.allmypapers.com/wp-content/uploads/2014/10/amp_wppr_Verify.pdf.

Gjomemo et al.: "Digital Check Forgery Attacks on Client Check Truncation Systems", International Conference on Financial Cryptography and Data Security, dated Nov. 9, 2014, https://link.springer.com/chapter/10.1007/978-3-662-45472-5_1.

Checkimage Collaborative: "A Guideline Document on Duplicate Image/IRD Prevention and Detection", dated Dec. 2006.

* cited by examiner

SYSTEMS AND METHOD OF MANAGING DOCUMENTS

TECHNICAL FIELD

The present application relates to systems and methods of managing documents and, in particular, to systems and methods of managing documents associated with resources.

BACKGROUND

The concept of transferring resources associated with documents finds application in a number of fields. Documents such as vouchers, cheques, value certificates, or the like, can be used to transfer one or a combination of resources such as services, monetary value, or goods. Thus, one entity can transfer resources to another entity by transferring a document that is associated with a finite resource. In scenarios where a hard copy document transfer or receipt may not be required, digitization of documents can streamline document management and the associated resource transfer. However, digitizing documents can result in an unintentional creation of two or more soft copies of a given document, thereby promulgating multiple transfers of a finite resource when only a single transfer of the finite resource was intended.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
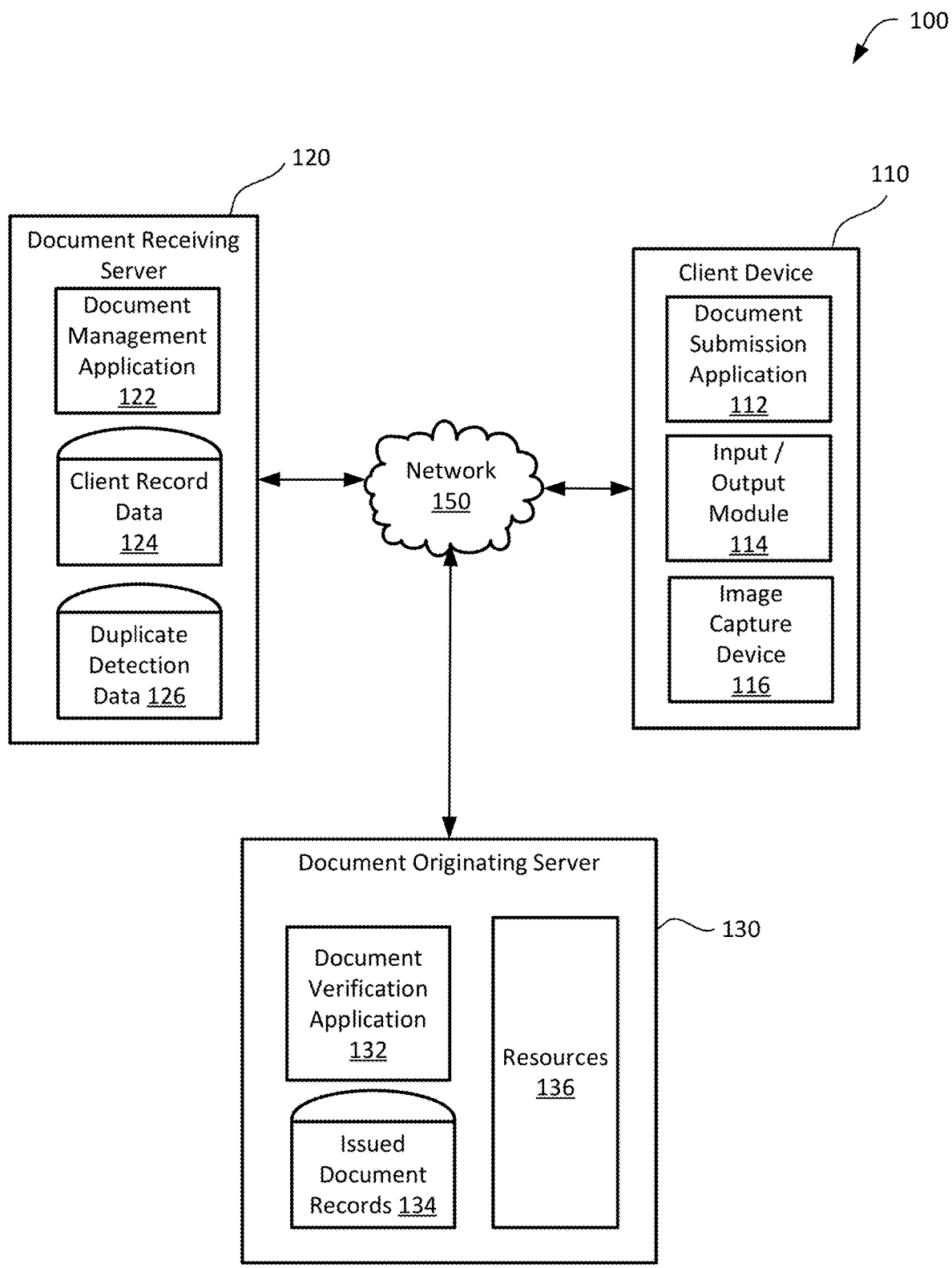
FIG. 1 illustrates, in block diagram form, a system for managing documents associated with resources, in accordance with an example of the present application.

In one aspect, the present application describes a system for managing a subject document associated with a resource, the system comprising: a communication module; a processor coupled to the communication module; and a memory coupled to the processor. The memory stores duplicate detection data and instructions that, when executed, configure the processor to: receive, via the communication module and from a client device, an image of the subject document; extract a document identifier from the image of the subject document; obtain a date associated with the subject document; determine that the subject document is unique by comparing a set of validation data values with the duplicate detection data, the set of validation data values including the obtained date and at least a portion of the extracted document identifier; and in response to determining that the subject document is unique, transmit, to the client device, a provisional acceptance notification and provisionally allocate the resource associated with the subject document to a data record corresponding to a second identifier.

In another aspect, the present application describes a computer-implemented method of managing a subject document associated with a resource. The method comprising: receiving, via a communication module and from a client device, an image of the subject document; extracting a document identifier from the image of the subject document; obtaining a date associated with the subject document; determining that the subject document is unique by comparing a set of validation data values with duplicate detection data, the set of validation data values including the obtained date and at least a portion of the extracted document identifier; and in response to determining that the subject document is unique, transmitting, to the client device, a provisional acceptance notification and provisionally allocating the resource associated with the subject document to a data record corresponding to a second identifier.

In another aspect, a non-transitory computer-readable storage medium storing processor-executable instructions that, when executed, cause a processor to carry out the operations of one or more methods described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

It will be appreciated that while numerous described examples of documents relate to cheques for transferring monetary value, the systems and methods for managing documents described herein can be used for managing other types of documents containing one or more of a combination of type-written or handwritten materials. Further, the various types of documents can be associated with resources other than monetary value or currency, such as tokens, digital assets, or services, among other examples.

Systems and methods for managing a subject document associated with a resource are described herein. The subject document can be associated with at least one resource such as services, monetary value, goods, digital assets, tokens, or the like. As a non-limiting example, a document originating entity may be associated with a first banking institution and the first banking institution may provide a first bank account for tracking monetary value of a payor entity. A document receiving entity may be associated with a second banking institution and the second banking institution may provide a second bank account for tracking monetary value of a payee entity. In some examples, the first banking institution may be different than the second banking institution. In some other examples, the first banking institution and the second banking institution may be the same institution.

In the event that the payor entity desires to transfer monetary value to a payee entity, the payor entity can create a document, such as a cheque, and provide the document to the payee entity to enable transferring monetary value to the payee entity. The payee entity may subsequently submit or deposit the document with the second banking institution at which the payee entity has a bank account to receive the monetary value in the bank account of the payee entity.

In the present example, document servers can process cheque deposits based, in part, on magnetic ink character recognition (MICR) data to verify the legitimacy or originality of the cheque. Banking institutions commonly receive a hard copy of received cheque documents and, thus, the likelihood that the exact cheque will be re-deposited can be low or non-existent.

To streamline methods of managing documents associated with resources, document servers can process image submissions (or submissions of other digital forms) received from the payee entity. The example document servers may not require receipt of a hard copy of the cheque document. As financial institutions, for example, may not receive hard copy cheque documents, it may be desirable to thwart attempts to submit multiple resource transfer requests based on a single cheque document (e.g., double depositing a cheque document). For example, banking applications being operated on a mobile device (e.g., smartphone) can be used to capture an image of a cheque and to transmit the image of the cheque to a banking institution for processing a cheque deposit and money transfer. Thus, as mobile deposit of resource transfer instruments (e.g., cheques) is increasingly used, thwarting mistaken or fraudulent attempts to multiple resource transfer requests based on a single cheque document may be desirable.

Documents for transferring value can include document identifiers, such as serial numbers, or the like. Continuing with the example above, cheque documents can have a document identifier, such as MICR data, printed thereon. MICR cheque data can include a document-type indicator, bank code, bank account number, or cheque number, among other data. As batches of cheque documents can be printed with a bank account number that is associated with the payor entity, the cheque number may be used for uniquely identifying a respective cheque document. Each cheque document can be distinguishable from another cheque document based on different MICR data due at least in part to a unique cheque number.

In some scenarios, banking institutions can permit the payor entity (or a third party on behalf of the payor entity) to create or print cheque documents on the condition that the created cheque documents include defined data, such as MICR data associated with the bank account of the payor entity. Although it may be imperative that at least the bank account number associated with the payor entity and the bank code associated with the banking institution be printed on such cheque documents, the banking institution may not require that cheque numbers printed on such cheque documents be unique (e.g., not previously used). As it may not be adequate to rely solely on MICR data printed on cheque documents for identifying attempts to double transfer resources using cheque documents, it may be desirable to provide systems and methods for managing documents associated with resources to ameliorate some of the deficiencies described herein. In some examples, it may be desirable to consider additional data values relating to the cheque documents for thwarting attempts to double transfer resources. Examples described herein highlight features of the present application relate to cheque documents in the context of resource transfers and deposits at banking institutions, however, other types of documents for transferring resources among other types of institutions are contemplated.

Reference is made to FIG. 1, which illustrates, in block diagram form, a system 100 for managing documents associated with resources, in accordance with an example of the present application. As described, documents may include cheque documents for transferring monetary value from a payor entity to a payee entity. It can be understood that documents being managed can be other types of documents, such as vouchers, digital certificates, or the like for transferring any other types of resources such as services, goods, tokens, digital assets, among other examples.

The system 100 can include a client device 110, a document receiving server 120, and a document originating server 130. The system 100 includes a network 150. The client device 110, the document receiving server 120, and the document originating server 130 can be configured to communicate with any other device over the network 150 or with any other similar computing device. The network 150 can include one or a combination of interconnected wired and wireless networks, including the internet, local area networks, wireless area networks, or the like.

In some examples, the document receiving server 120 and the document originating server 130 can be computing servers for organizations such as banking institutions. The document originating server 130 can be associated with a banking institution at which the payor entity has a bank account. The document receiving server 120 can be associated with a banking institution at which the payee entity has a bank account. In FIG. 1, the document receiving server 120 and the document originating server 130 are illustrated as separate computing devices. That is, the document receiving server 120 can be implemented apart from the document originating server 130. However, in some examples, the document receiving server 120 and the document originating server 130 can be combined into a single computing system or can be within a computing domain executing the operations described herein. That is, the banking institution at which the payor entity may have a bank account and the banking institution at which the payee entity may have a bank account may be the same banking institution.

The client device 110 can be associated with a payee entity. The client device 110 includes one or more processors, memory, and a communications module for providing network communications capabilities with other computing devices. The client device 110 can also include an image capture device 116 for capturing images of documents. The documents can be associated with resources and the payee entity can deposit the received documents for receiving transfer of resources from a payor entity. As will be described, in some examples, a client device 110 can deposit a received document by capturing an image of a document and transmitting the image of the document to the document receiving server 120.

The payee entity may have received a hard copy cheque document from a payor entity. The cheque document may be associated with monetary value that the payor entity intends to transfer to the payee entity. The payee entity can deposit the hard copy cheque document at a banking institution, thereby surrendering the cheque document to the banking institution in exchange for the monetary value. As an alternative, the payee entity associated with a client device 110 can transmit a soft copy of the cheque document to the document receiving server 120. For example, the client device 110 can include memory that stores a document submission application 112 having processor readable instructions that, when executed cause the processor to perform operations to capture an image of the cheque document for deposit at a financial institution, among other example operations described herein. Thus, the payee entity can transmit the cheque document to the document receiving server 120 (e.g., being associated with a bank account of the payee entity) without needing to visit a brick-and-mortar banking institution location.

In some examples, the client device 110 can provide a user interface displayed via an input/output module 114 for a user to interact with the client device 110. The input/output module 114 can include a touch screen display for displaying a user interface and a touch screen interface for receiving motion or touch input from the user of the client device 110. Other examples of input/output modules for displaying content to the user or for receiving input signals representing commands or selectable options from the user of the client device 110 are contemplated. The input/output module 114 can receive data values such as dates, resource amounts, or other data values and receive input that indicates that such data values are associated with the image of the cheque document.

The document receiving server 120 can be a single server, multiple servers, a server farm, or any other such arrangement of computing devices to implement computing server-like functionality. The document receiving server 120 includes one or more processors, memory, and a communication module for providing communications capability with other computing devices. As an illustrating example, the document receiving server 120 can be associated with a banking institution at which the payee entity has a bank account and at which the payee entity wishes that a resource be transferred to.

The document receiving server 120 includes client record data 124. The client record data includes data structures having information associated with one or more client devices, where the client devices may be computing devices associated with respective users or payee entities. In some examples, the client record data 124 includes bank account information associated with payee entities, where the bank account information includes a running balance of monetary value associated with the respective payee entities. Example bank account information for respective payee entities can be associated with an entity identifier, such as an account number or a payee identifier.

The document receiving server 120 can also include duplicate detection data 126. The duplicate detection data 126 may include data associated with documents that have previously been transmitted to the document receiving server 120. For instance, documents that were previously deposited may include cheque documents having document identifiers (e.g., MICR data). The duplicate detection data 126 can also include payee name data, date data, or like data that is associated with respective documents that were previously submitted and that is associated with a previously completed resource transfer.

In some examples, the document receiving server 120 may retain the duplicate detection data 126 for a defined period of time. Subsequent to the defined period of time, the document receiving server 120 can purge the duplicate detection data 126. For instance, the duplicate detection data 126 may be stored at the document receiving server 120 for 180 days and the document receiving server 120 may purge at least one data entry from the duplicate detection data 126 that is older than 180 days. The document receiving server 120 may purge the duplicate detection data 126 to manage computing resources, such as processing resources, memory resources, or the like. In particular, by periodically purging duplicate detection data 126, the document receiving server 120 may better focus search queries to be based on recent data (e.g., data from the last 180 days). Banking institutions may not accept cheque documents that are dated beyond 180 days. Thus, it may be desirable to purge duplicate detection data 126 when the data is more than 180 days old, as cheques that are more than 180 days beyond the cheque date may not be accepted in any event. Further, purging duplicate detection data 126 may reduce the data set to be processed and may increase the speed of analysis conducted at the document receiving server 120. The document receiving server 120 described above may purge duplicate detection data that may be older than 180 days; however, any other defined period of time may be used.

The document receiving server 120 may utilize the duplicate detection data 126 for identifying subject documents that have previously been imaged and transmitted to the document receiving server 120. Transferring resources based on a subject document that had previously been transmitted to the document receiving server 120 may be identified as a double deposit (e.g., an attempt to transfer a finite resource more than once). That is, a double deposit of a cheque document may occur when an entity attempts to transfer resources (e.g., money or other asset) more than once using that cheque document. Accordingly, the document receiving server 120 can utilize the duplicate detection data 126 for identifying double deposits of subject documents. When such double deposit is identified, the document receiving server 120 can notify a client device that the particular subject document may already have been used to transfer resources. When the document receiving server 120 determines that a subject document is unique, the document receiving server 120 can transmit, in real-time or in near real-time, a notification to the client device 110 that the subject document may be provisionally accepted for deposit.

In FIG. 1, the client record data 124 is illustrated as being separate from the duplicate detection data 126. In some other examples, the client record data 124 and the duplicate detection data 126 can be included in a common data structure. That is, instead of maintaining separate data structures, the client record data 124 can include records of resource transfer transactions associated with a document identifier (e.g., MICR data), an obtained date, and a resource amount associated with documents or document images that have previously been transmitted to the document receiving server 120.

The document receiving server 120 includes a document management application 122 having processor executable instructions stored in memory that, when executed, cause a processor to conduct operations described herein for managing a subject document associated with a resource. For example, the processor executable instructions can configure the processor to receive, from the client device 110, an image of a subject document and extract a document identifier from the image of the subject document. The document identifier can be the MICR data from a cheque document. As the document identifier may not be a unique document identifier, the processor can further obtain a date associated with the subject document. For example, the date can be obtained using optical character recognition (OCR) operations. In another example, the date can be obtained by receiving, from the client device 110, the date obtained via the input/output module 114 (e.g., touchscreen or keypad input). The obtained date may be a date provided by the user of the client device 110. As will be described, the document receiving server 120 can compare the date input (e.g., received via the input/output module 114) and an extracted document date (e.g., obtained using OCR operations). If the date input and the extracted document date are different, the processor can conduct operations described herein based on both the date input and the extracted document date. Further, the processor can determine whether the subject document is unique by comparing the obtained date and at least a portion of the extracted document identifier with duplicate detection data. In response to determining that the subject document is unique, the document receiving server 120 can transmit, to the client device 110, a provisional acceptance notification. Further, the document receiving server 120 can provisionally allocate the resource associated with the subject document to a record corresponding to an identifier of the payee entity associated with the client device 110.

The document originating server 130 can be a single server, multiple servers, a server farm, or any other such arrangement of computing devices to implement computing server-like functionality. The document originating server 130 includes one or more processors, memory, and a communication module for providing communications capability with other computing devices. The document originating server 130 can be associated, for example, with a banking institution at which the payor entity has a bank account. The document originating server 130 can administer and keep records of the bank account which the payor entity wishes to transfer resources (e.g., associated with a cheque document) from. For instance, the payor entity may create a cheque document that includes MICR data (e.g., bank account information associated with the financial institution operating the document originating server) and that identifies the bank account from which resources are to be transferred from.

The document originating server 130 can include a document verification application 132 having processor executable instructions stored in memory that, when executed, cause a processor to conduct operations described herein to verify whether a subject document deposit is unique. As a subject cheque document may be used for providing details such that the document originating server 130 may transfer resource value to a payee entity associated with the client device 110, the document verification application 132 can include instructions that cause the processor to conduct operations to validate whether the intended resource value transfer associated with the subject cheque document had already been made at a prior point in time.

The document originating server 130 can track resources 136. Resources can include currency, monetary value, digital assets, tokens, precious metals, among other examples of value. In the present example, the resources 136 illustrated in FIG. 1 can be a data structure for tracking a running balance of money being managed by a banking institution. The document originating server 130 can also include issued document records 134. The issued document records 134 may include a data structure having information associated with a bank account of a payor entity. For example, the information associated with a bank account can include data associating one or more resources with a bank account of a payor entity.

Further, the issued document records 134 can include data indicating previous transfers of resources associated with a particular cheque document from a bank account of a payor entity to a bank account of a payee entity. The document originating server 130 can identify a duplicate deposit by comparing (i) document identifier information associated with a previously completed resource transfer transaction and (ii) document identifier information from a subject document recently received from a payee entity. Because the document originating server 130 can track resources from which the payor entity transfers to a payee entity, the document originating server 130 may be well suited for identifying whether resources associated with a cheque document have, in fact, already been transferred.

However, in the scenario where the document receiving server 120 and the document originating server 130 are separate computing servers of separate banking institutions, data messages transmitted between the document receiving server 120 and the document originating server 130 may experience processing latency. Processing latency can be due, in part, to batch processing, network latency, server queue latency, or the like. Because it may be desirable to provide the client device 110 with real-time, or with substantially real-time, indication of whether the deposited subject document is unique or whether the deposited subject document is likely a double deposit, the system 100 described herein provides systems and methods for provisionally determining whether a deposited subject document is unique and for providing in real-time an indication of the same.

Figure 2:
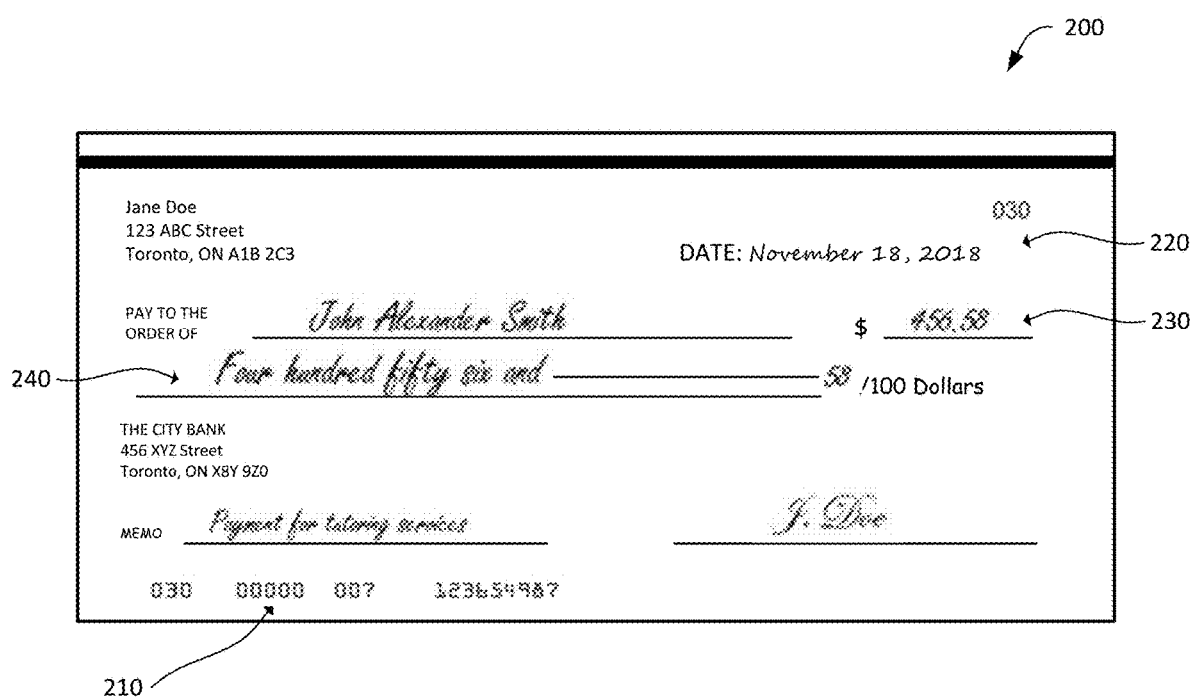
FIG. 2 illustrates an example subject document associated with a resource, in accordance with an example of the present application.

Reference is made to FIG. 2, which diagrammatically illustrates an example subject document 200 associated with a resource, in accordance with an example of the present application. A document may be described as a cheque document for transferring monetary value; however, it will be understood that documents can include other types of documents for transferring other types of resources among a variety of types of institutions.

In FIG. 2, the subject document 200 is an example cheque document. The cheque document can be created by a payor entity. In FIG. 2, the payor entity is "Jane Doe". A document originating server 130 may be associated with a banking institution having the name "THE CITY BANK". The subject document 200 can be a cheque instrument directing a banking institution to transfer value to a payee entity, "John Alexander Smith". The subject document 200 may include a date field 220 having a date value, written as "Nov. 18, 2018". The subject document 200 may also include a resource amount field 230. In the illustrated example of FIG. 2, a resource amount of $456.58 is specified using numbers. Further, the subject document 200 includes a written field 240 having the resource amount written out, for example, in words. In the illustrated example of FIG. 2, the words "Four hundred fifty six . . . " is provided and corresponds to the resource amount specified in the resource amount field 230.

The subject document 200 includes a document identifier 210, such as MICR data. The MICR data can include a cheque number (e.g., "030"), a banking institution transit number (e.g., "00000"), a banking institution number (e.g., "007"), and an account number (e.g., "123654987"). The document identifier 210 in FIG. 2 is illustrative and can include one or a combination of any other alpha-numeric text, or machine-readable indicium included in the subject document 200.

In some examples, the banking institution transit number, the banking institution number, and the account number may be static or the same for numerous cheque documents of the payor entity, Jane Doe. For each successive cheque document created by the payor entity, the cheque number may be incremented by one number. In some scenarios, the banking institution (e.g., "THE CITY BANK") can permit cheque documents to be printed by a third party. However, the third party may print cheque documents having cheque numbers without regard to what cheque numbers were previously used. Thus, in some scenarios, the MICR number cannot be relied upon as a unique number for identifying a cheque document. It may be desirable to determine whether a subject document is unique based on additional data values associated with the subject document.

Figure 3:
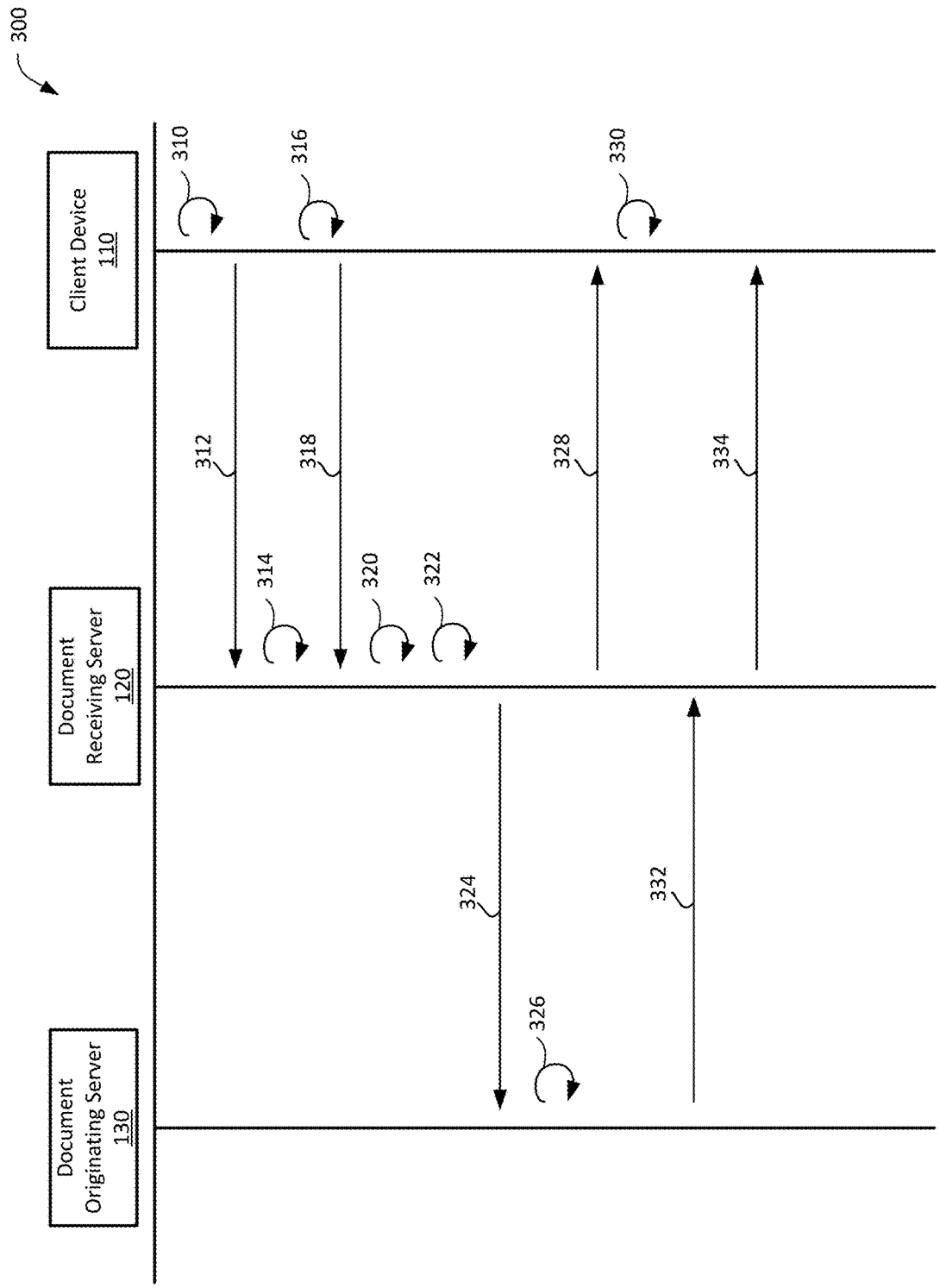
FIG. 3 illustrates a signal diagram illustrating exchanges among computing devices for managing subject documents associated with resources, in accordance with an example of the present application.

Reference is now made to FIG. 3, which illustrates a signal diagram 300 illustrating exchanges among computing devices for managing subject documents associated with resources, in accordance with an example of the present application. The signal diagram 300 includes the example client device 110, the document receiving server 120, and the document originating server 130 of FIG. 1.

The signal diagram 300 illustrates operations that may be implemented, at least in part, through processor executable instructions stored at one or more of the computing devices. The operations may be carried out by one or more processors of the respective devices, servers, or applications thereon. Further, the signal diagram 300 illustrates operations or exchanges associated with particular computing servers or devices. It can be understood that although a particular operation may be illustrated as being conducted at one particular device, it can be contemplated that the particular operation may be conducted alternatively at another device. For example, conducting optical character recognition operations for identifying data values may be described as being conducted at the document receiving server 120; however, conducting optical character recognition operations can in other examples be conducted at the client device 110.

At operation 310, the client device 110 captures an image of a subject document. The subject document may be associated with a resource. For example, the subject document may be a cheque document associated with a monetary value. A payor entity may have created the cheque document for directing a banking institution to transfer value to a payee entity that is associated with the client device 110. The payee entity may be a user of the client device 110 and may, at operation 310, capture an image of the cheque document.

At operation 312, the client device 110 transmits the captured image of the subject document to the document receiving server 120. The document receiving server 120 may be associated with a banking institution at which the payee entity has a bank account thereat.

In some examples, the client device 110 may transmit a timestamp indicating the time and/or date that the image of the subject document was captured. In some examples, the document receiving server 120 may associate a timestamp or date stamp with the received captured image of the subject document. In some other examples, the document receiving server 120 may associate a timestamp or date stamp when a "cheque deposit" operation is made. In some scenarios, the example date stamps or time stamps described above can be substantially the same time and/or date.

At operation 314, the document receiving server 120 extracts a document identifier from the image of the subject document. For example, the document receiving server 120 can extract MICR data from the cheque document, where the document receiving server 120 can identify data values associated with the MICR data. The data values can include a payor entity bank account number, a bank institution number, or a cheque number, among other example data values.

At operation 316, the client device 110 can receive a date obtained via the input/output module 114 (FIG. 1) of the client device 110. For example, the client device 110 can provide a graphical user interface prompt instructing a user of the client device 110 to input a date of the cheque document and the client device 110 can receive, via an input interface, a date value associated with the cheque document.

At operation 318, the client device 110 transmits the obtained date to the document receiving server 120 and the document receiving server 120, at operation 320, can obtain the date associated with the subject document. Obtaining a date via the input/output module 114 of the client device 110 is one example of obtaining the date associated with the subject document.

In some other examples, the document receiving server 120 can, at operation 320, conduct character recognition operations for extracting a document date from the image of the subject document. In some other examples, the document receiving server 120 can obtain the date associated with the subject document based both on optical character recognition and an obtained date received at the input/output module 114 of the client device 110. In the example where the document receiving server 120 can obtain a date based both on optical character recognition (OCR) and on an obtained date received via the input/output module 114, the date based on OCR and the date received via the input/output module 114 can be different. For instance, a handwritten date may not be accurately identified by OCR or numerically written date may not be provided in a standardized format (e.g., 11/12/2018 potentially being Nov. 12, 2018 or Dec. 11, 2018). To consider the different dates that are obtained, the operations herein for identifying unique subject documents can utilize each of the respective dates when determining whether a subject document is unique.

In some examples, the document receiving server 120 may, using the obtained timestamp and the obtained date associated with the subject document, evaluate whether the subject document is expired. For instance, a subject document may have a document expiry date that is 6 months from the date associated with the subject document. The document expiry date may be calculated based on an obtained date associated with the subject document and an expiry period. When a cheque document has an expiry period of 6 months, a cheque document written on January $1^{st}$ will expire on June 30. Accordingly, the document receiving server 120 may utilize the obtained timestamp to determine whether the timestamp is a time and/or date that is subsequent to the document expiry date. It can be appreciated that the document expiry period may be related to operations at the document receiving server 120 for purging duplicate detection data 126, as described above. For example, the document expiry period (e.g., 6 months) can correspond to the defined period of time (e.g., 180 days) criteria to trigger purging duplicate detection data. Further, it can be appreciated that the timestamp or date stamp associated with the subject document can be obtained or determined in other ways different than the examples described above.

In some examples, when the document receiving server 120 determines that the subject document is expired based on the timestamp, the document receiving server 120 may transmit a provisional expiry notification to the client device 110. The provisional expiry notification can include a textual message informing the payee entity that the submitted image of the subject document appears to be expired. In some examples, the provisional expiry notification can further suggest that the payee entity visit a brick-and-mortar location in the event that the payee entity believes the notification to be erroneous.

The client device 110 can also receive a resource amount obtained via the input/output module 114 of the client device 110. For example, the resource amount can be the resource value indicated on the subject document. Referring again to FIG. 2, the resource value of a cheque document can be $456.58, which is to be transferred to the payee entity.

At least a portion of the document identifier, the obtained date, the resource value, or other data values can, in combination, be identified as validation data values and the document receiving server 120 may compare the validation data values with duplicate detection data described herein for determining whether the subject document is unique.

At operation 322, the document receiving server 120 determines whether the subject document is unique by comparing the set of validation data values with the duplicate detection data. For example, the document receiving server 120 can compare a combination of a date, document identifier, and/or resource value (e.g., validation data values) associated with a subject document to respective entries comprising a date, document identifier, and/or resource value (e.g., validation data values) in the duplicate detection data 126 for determining whether the subject document (or an image of the subject document) had previously been transmitted to the document receiving server. The document receiving server 120 can determine that the subject document is unique by determining that the set of validation data values is distinct from the duplicate detection data 126 (FIG. 1). For example, if the cheque document had not previously been submitted to the document receiving server 120 for deposit, the document receiving server 120 may determine that a combination of the obtained date and the portion of the document identifier does not match or correspond to any of the data entries in the duplicate detection data 126. When the validation data values are distinct from data transaction entries stored the duplicate detection data, the document receiving server 120 can determine that the cheque document is likely not being "double deposited" at the document receiving server 120.

If the cheque document had been previously submitted to the document receiving server 120 by the client device 110, by any other computing device apart from the client device 110, or by surrender of a hard copy of the cheque document, the document receiving server 120 may determine that the validation data values match or corresponds to at least one data transaction entry in the duplicate detection data 126. When the validation data values correspond to at least one data transaction entry in the duplicate detection data 126, the document receiving server 120 may determine that it is likely that the cheque document is being "double deposited".

In some scenarios, the document receiving server 120 may be unable to determine with substantial certainty whether the example cheque document had already been the subject of a resource transfer from the payor bank account to the payee bank account. For example, the payee may have two or more distinct banking accounts associated with distinct document receiving servers, respectively. The payee may attempt to deposit the cheque document to each of the two or more distinct banking accounts. Because the distinct document receiving servers may not share duplicate detection data or similar records, the respective document receiving servers may be unable to identify with substantial certainty a double deposit scenario. In another example, the example cheque document can specify two payee names (e.g., John and Jane). As either John or Jane could deposit the cheque document, both John and Jane could attempt to deposit the cheque document into distinct bank accounts (e.g., a bank account in John's name and a distinct bank account in Jane's name). To identify a deposit of a single subject document (e.g., cheque document) to each of two or more different bank accounts, it may be desirable to determine whether the subject document is unique from the perspective of the document originating server 130.

At operation 324, the document receiving server 120 may further transmit, to the document originating server 130, the set of validation values for determining whether the subject document is unique from a viewpoint of the document originating server 130. That is, as the document originating server 130 tracks resources 136 (FIG. 1) from which transfers may be made, the document originating server 130 can identify whether the resource value associated with the cheque document has already been transferred to the payee entity at a previous point in time. As described, the set of validation values can include a combination of two or more of the obtained date, a portion of the document identifier, or the resource value.

The document originating server 130, at operation 326, determines whether the subject document is unique based on the received set of validation data values and issued document records 134 (FIG. 1). For instance, the document originating server 130 can compare a combination of a date, document identifier, and/or resource value (e.g., validation data values) associated with the cheque document to respective entries comprising a date, document identifier, and/or resource value (e.g., validation data values) in the issued document records 134.

In some scenarios, the document originating server 130 may not provide responses to the document receiving server 120 in a timely fashion. For example, the document originating server 130 may conduct operations using batch processes at periodic time intervals (e.g., nightly, every other day, etc.). As it may be desirable to provide the client device 110 with real-time, or near real-time, indication of whether the deposit of the subject document is acceptable, the document receiving server 120, at operation 328, may transmit a provisional notification to the client device indicating whether the subject document is likely unique. That is, the document receiving server 120 may conduct operation 328 before receiving a duplicate detection result from the document originating server 130. The transmitted provisional notification may be based on duplicate detection data 126 stored at the document receiving server 120.

In the scenario where the document receiving server 120 determines that the subject document is unique, a provisional acceptance notification is transmitted to the client device 110 at operation 328. Further, the document receiving server 120 can provisionally allocate the resource associated with the subject document to a client record data 124 corresponding to an identifier of the payee entity associated with the client device 110.

In the scenario where the document receiving server 120 determines that the subject document is not unique, the provisional notification provided at operation 328 may be a decline notification. The decline notification can include a message directing the payee entity associated with the client device 110 to visit the banking institution at a brick-and-mortar location.

At operation 330, the client device 110 can display the provisional notification via the input/output module 114 (FIG. 1). For example, the client device 110 can display the provisional notification as a graphical user interface prompt.

After some latency time period, the document originating server 130, at operation 332, can transmit a duplicate detection result to the document receiving server 120 to indicate whether the subject document is unique. That is, the document originating server 130 can indicate whether the resource value associated with the subject document has, in fact, already been transferred to a bank account of the payee entity.

At operation 334, the document receiving server 120 can transmit a confirmation notification to the client device 110 indicating whether the resource transfer associated with the subject document has been accepted by the document originating server 130. For example, in the scenario that the document receiving server 120 determines that the resource value associated with the subject document has not been transferred (e.g., subject document is unique and not a "double deposit"), the document receiving server 120 can transmit a notification to the client device 110 for confirming the resource transfer. Further, the document receiving server 120 can allocate the resource value to the bank account of the payee entity associated with the client device 110.

In examples described herein, because operations for comparing validation data values with duplicate detection data 126 or for comparing validation data values with issued document records 134 is based on comparing textual or alphanumeric data (e.g., non-image data), operations for determining whether a subject cheque document is unique may be relatively simpler and/or less computationally intensive as compared to operations for comparing graphical images of subject cheque documents stored at the respective servers or devices.

Figure 4:
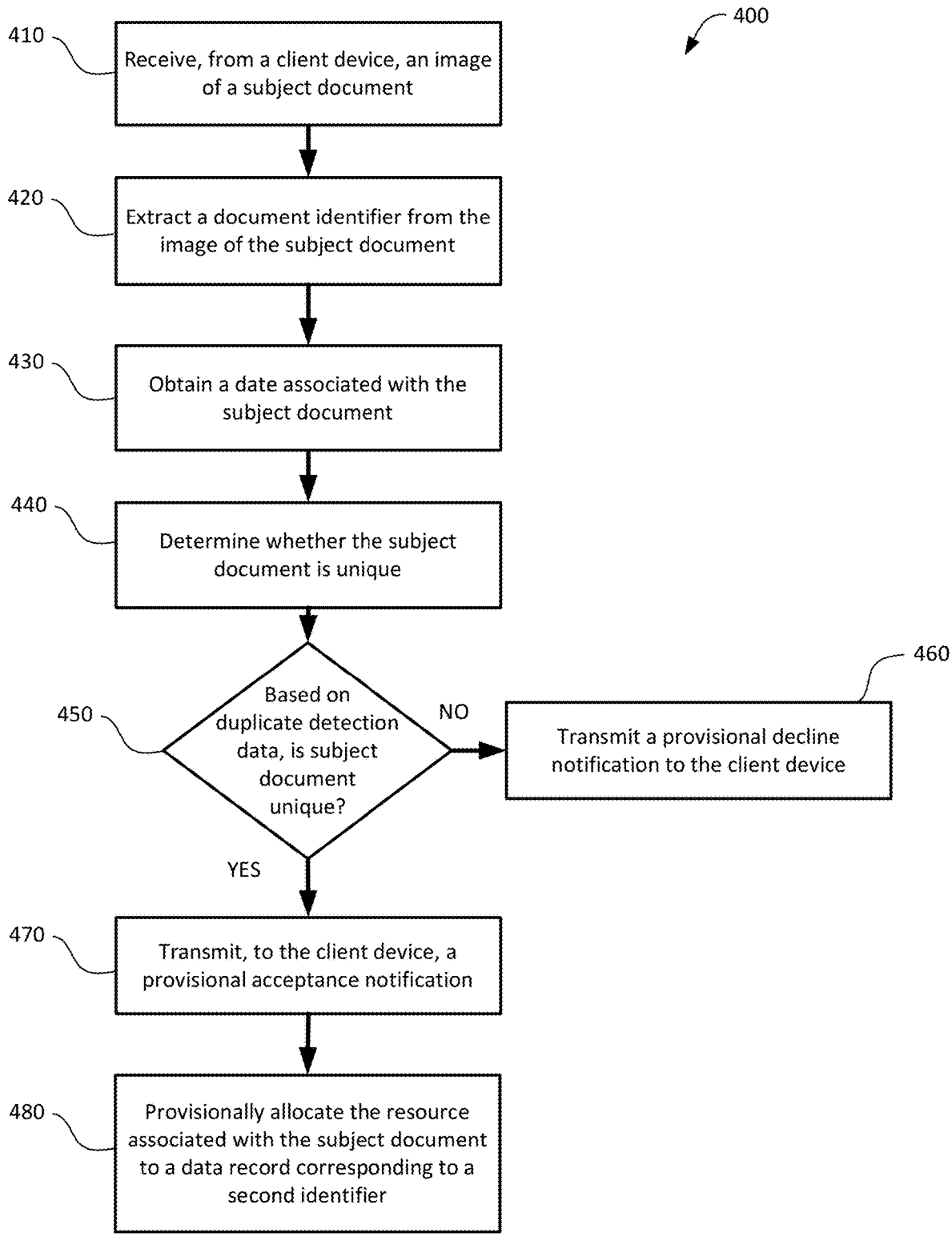
FIG. 4 illustrates, in flowchart form, a method of managing a subject document associated with a resource, in accordance with an example of the present application.

Reference is made to FIG. 4, which illustrates, in flowchart form, a method 400 of managing a subject document associated with a resource, in accordance with an example of the present application. The method 400 includes operations that may be carried out by one or more processors of the document receiving server 120 (FIG. 1). For example, the method 400 can be implemented, at least in part, through processor executable instructions associated with the document management application 122 (FIG. 1). In some examples, one or more operations may be implemented via processor executable instructions in other applications or in an operating system stored and executed on the document receiving server 120.

At operation 410, the processor receives, from the client device 110 (FIG. 1), an image of a subject document. The subject document can be a cheque document that a payee entity received from a payor entity. The cheque document can be for directing a banking institution to transfer value to the payee entity of the cheque document. The payee entity can, using the client device 110, capture an image of the cheque document and submit the image to the document receiving server 120 for initiating deposit of the cheque document in a bank account of the payee entity.

At operation 420, the processor extracts a document identifier from the image of the subject document. Continuing with the example of the cheque document, the document identifier 210 (FIG. 2) can be MICR data that includes alphanumeric or numeric characters for identifying the subject document, for identifying a banking institution, for identifying a bank account of the payor entity, and for identifying other features of the subject document.

At operation 430, the processor obtains a date associated with the subject document. Referring again to FIG. 2, the date associated with the subject document can be the date that the subject document was issued by the payor entity (e.g., Jane Doe) to the payee entity (e.g., John Alexander Smith).

In some examples, the processor receives, from the client device 110, the date obtained via the input/output module 114 (FIG. 1) of the client device 110. That is, the client device 110 may present a graphical user interface prompt directing the user to enter a date of the cheque document. In some examples, the processor can also receive, from the client device 110, a resource amount obtained via the input/output module 114 (FIG. 1) of the client device 110. As subject documents may include a document identifier that may not be unique, the document identifier may be inept for uniquely identifying the subject document. Accordingly, additional data values such as the obtained date or the resource amount associated with the cheque document can be considered when determining whether the cheque document is a double deposit.

At operation 440, the processor determines whether the subject document is unique by comparing a set of validation data values with the duplicate detection data 126 (FIG. 1). For example, the set of validation data values can include a combination of the obtained date and at least a portion of the extracted document identifier. In scenarios where a resource amount is obtained from the client device 110, the set of validation data values can include a combination of the obtained date, at least a portion of the extracted document identifier, and the obtained resource amount.

In some examples, the duplicate detection data 126 may be non-image data. Non-image data can include alphanumeric text data. As operations for comparing alphanumeric text data can be relatively simpler and less computationally intensive than operations for comparing graphical images, at operation 440, the processor advantageously compares previously extracted or received alphanumeric text, thereby reducing complex comparative operations that otherwise would be associated with image or graphic comparison operations.

At operation 450, the processor determines based on duplicate detection data 126 whether the subject document is unique.

The processor can determine that the subject document is not unique when the set of validation data values (e.g., the combination of the obtained date, the document identifier, the obtained resource value, etc.) matches one or more data entries of the duplicate detection data 126. Thus, the processor, at operation 460, may transmit a provisional decline notification to the client device 110 indicating that the subject document appears to have been previously deposited at the document receiving server 120 at a prior point in time. The client device 110 can display, on the input/output module 114 (FIG. 1), the decline notification message that the subject document may be a "double deposit". In some examples, the decline notification message may recommend that the payee entity associated with the client device 110 visit a brick-and-mortar location to remedy the provisional declined deposit.

In some examples, the duplicate detection data 126 may not be associated with any specific payee account or client record data 124. Thus, the processor can determine whether the subject document is unique based on the set of duplicate detection data 126 at the particular document receiving server 120. For instance, where a subject document is a cheque document made out to "John or Jane", either John or Jane can submit an image of the subject document to the document receiving server 120 for "cheque deposit". If John has already submitted the subject document to the document receiving server 120 to a bank account associated only with John and when Jane attempts to submit the subject document to the document receiving server 120 to another bank account associated only with Jane, the processor can nonetheless identify that the submission by Jane is a "double deposit", as the duplicate detection data 126 may not be associated with any specific bank account associated with payees. Thus, the duplicate detection data 126 may be a set of data used for determining whether any newly received subject document is a duplicate document.

The processor can determine that the subject document is unique when the set of validation data values (e.g., the combination of the obtained date, the document identifier, the obtained resource value, etc.) is distinct from respective transaction entries of the duplicate detection data 126. In response to determining that the subject document is unique, the processor, at operation 470, transmits to the client device 110 a provisional acceptance notification. The provisional acceptance notification can be a graphical user interface prompt displayed on a output module of the client device 110 and can provide the payee entity (e.g., user of the client device 110) real-time or near real-time indication that the submitted image of the subject document does not appear to be a double deposit at the document receiving server 120. Further, the provisional acceptance notification can indicate that final allocation of the resource associated with the subject document can occur pending a duplicate detection result and/or other screening result from the document originating server 130 (e.g., server associated with a banking institution having the bank account of the payor entity).

At operation 480, the processor provisionally allocates the resource associated with the subject document to a data record corresponding to a user identifier. For example, the payee entity may have a client record at the document receiving server 120 that is associated with a bank account. The user identifier may be a payee entity account number. The processor, at operation 480, can provisionally update a resource balance (e.g., monetary value balance) of the client record to include the resource associated with the subject document. In some examples, provisionally updating the resource balance includes updating the total bank account balance to include the resource associated with the subject document; however, the resource balance can include a hold on at least a portion of the resource value until a duplicate detection result is received from the document originating server 130.

As described, the document receiving server 120 can determine whether a subject document is expired based on a timestamp of an image of the subject document and a document expiry date. Because the document receiving server 120 can transmit a provisional expiry notification to the client device 110 upon determining that the subject document may be expired, retaining duplicate detection data 126 beyond the document expiry period may not be required. That is, in some scenarios, the document receiving server 120 may not conduct operations to allocate resources associated with an expired subject document. In some examples, the document receiving server 120 may conduct operations to purge at least one transaction data entry in the duplicate detection data 126 that is older than the expiry period.

As described, solely relying on document identifiers associated with subject documents may be insufficient for distinguishing a particular subject document from another subject document. To address these insufficiencies, it may be desirable to utilize additional data values associated with subject documents to thwart attempts at double transfer of resources. As described, the client device 110 can receive date input or resource data values via the input/output module 114 (FIG. 1) from a payee entity associated with the client device 110. However, in the scenario where the payee entity inadvertently provides an incorrect date or resource data value that is associated with the subject document, operations for determining whether the subject document is unique may be deficient. Accordingly, it may be desirable to provide operations for validating received data value input.

Figure 5:
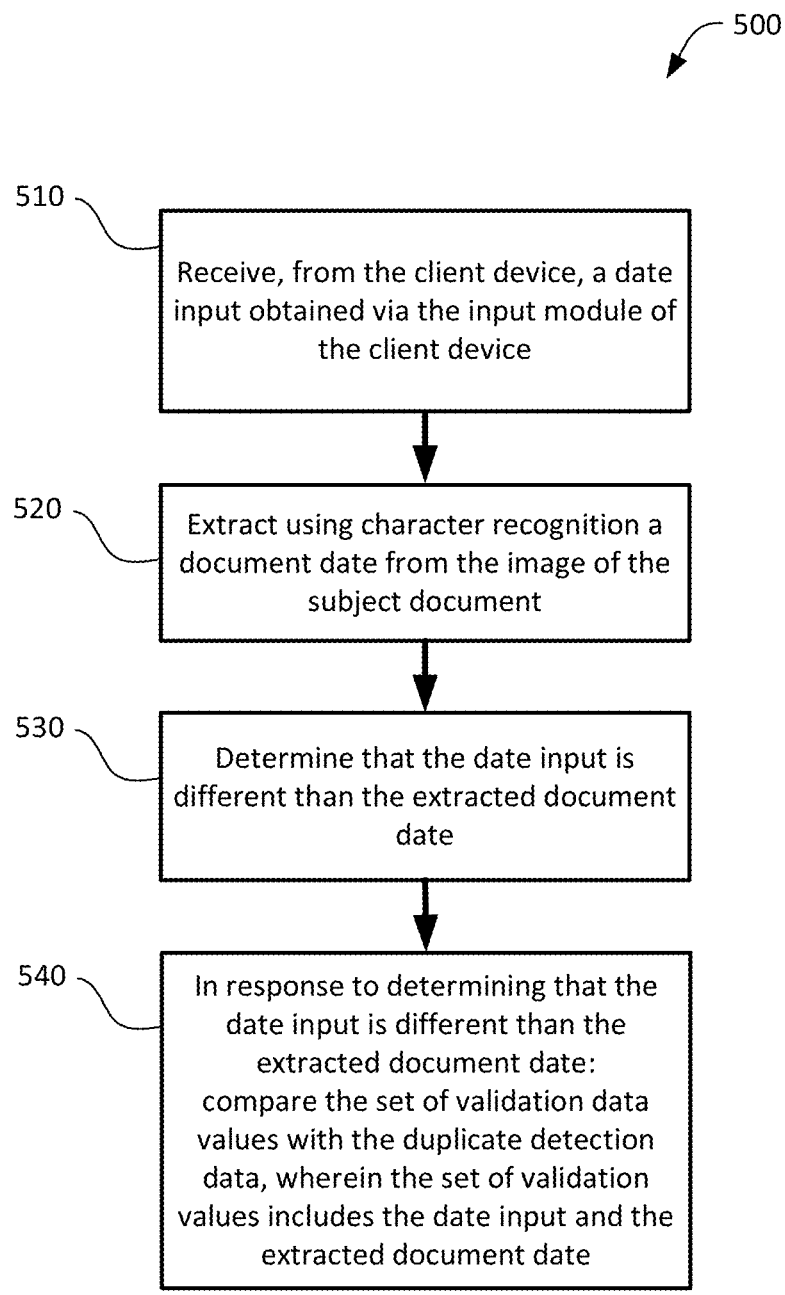
FIG. 5 illustrates, in flowchart form, a method of managing a subject document associated with a resource, in accordance with another example of the present application.

Reference is now made to FIG. 5, which illustrates, in flowchart form, a method 500 of managing a subject document associated with a resource, in accordance with another example of the present application. The method 500 includes operations that may be carried out by one or more processors of the document receiving server 120 (FIG. 1). For example, the method 500 can be implemented, at least in part, through processor executable instructions associated with the document management application 122 (FIG. 1). In some examples, one or more operations may be implemented via processor executable instructions in other applications or in an operating system stored and executed on the document receiving server 120.

At operation 510, the processor receives, from the client device, a date input obtained via the input/output module 114 of the client device 110. For example, the client device 110 can provide a graphical user interface prompt for prompting a payee entity to provide a date associated with the submitted subject document. Subsequently, the client device 110 can transmit the received date input to the document receiving server 120 for receipt by the processor of the document receiving server 120.

At operation 520, the processor extracts, using character recognition operations, a document date from the image of the subject document. As an example, referring again to FIG. 2, the processor can conduct optical character recognition operations to identify the date that is handwritten or typewritten in the date field 220. In some examples, operation 510 and operation 520 corresponds to operation 430 of FIG. 4.

In some scenarios, handwritten or type-written data can be obscured by artifacts (e.g., ink smudges, dust, etc.) and operations for conducting optical character recognition can provide erroneous data. Further, a date associated with a subject document may not be provided in a standardized format. For instance, a date can be provided as 11/12/2018 and it may not be apparent whether the payee entity intended to provide a date of Nov. 12, 2018 or Dec. 11, 2018. Further, in some scenarios, the payee entity submitting the subject document via the client device 110 may inadvertently provide date input that does not correspond to a date associated with the subject documents.

To remedy some of the deficiencies highlighted above, the processor, at operation 530, can determine that the date input is different than the extracted document date. That is, the processor compares the date input (e.g., received as payee entity input at the client device 110) and the date extracted using character recognition from the subject document.

In response to determining that the date input is different than the extracted document date, the processor, at operation 540 can append both the date input and the extracted document date to the set of validation data values. Further, at operation 540, the processor can compare the set of validation data values with the duplicate detection data 126 (FIG. 1) to determine whether the subject document is unique. Thus, despite obtaining multiple date values for a given subject document, the processor may conduct operations to include the multiple date values as data points (e.g., both date input and date from OCR, where date input does not match date from OCR) for determining whether the subject document is unique. For instance, a first set of validation data values including the date obtained by user input may be compared to the duplicate detection data 126. Further, a second set of validation data values including the date obtained via optical character recognition operations may be compared to the duplicate detection data 126, such that the various data points are considered. In the present example, the document receiving server 120 may determine that a subject cheque document is a duplicate if either the first set of validation data values or the second set of validation values corresponds to a transaction entry in the duplicate detection data 126.

In some examples, the document receiving server 120 can conduct operations to determine whether the subject cheque document is expired based on both the date obtained from user input and the date obtained from OCR. That is, the document receiving server 120 may determine that a subject cheque document is expired if a document deposit is attempted after an expiry period measured from either: (i) the date obtained via user input; or (ii) the date obtained via OCR operations.

Figure 6:
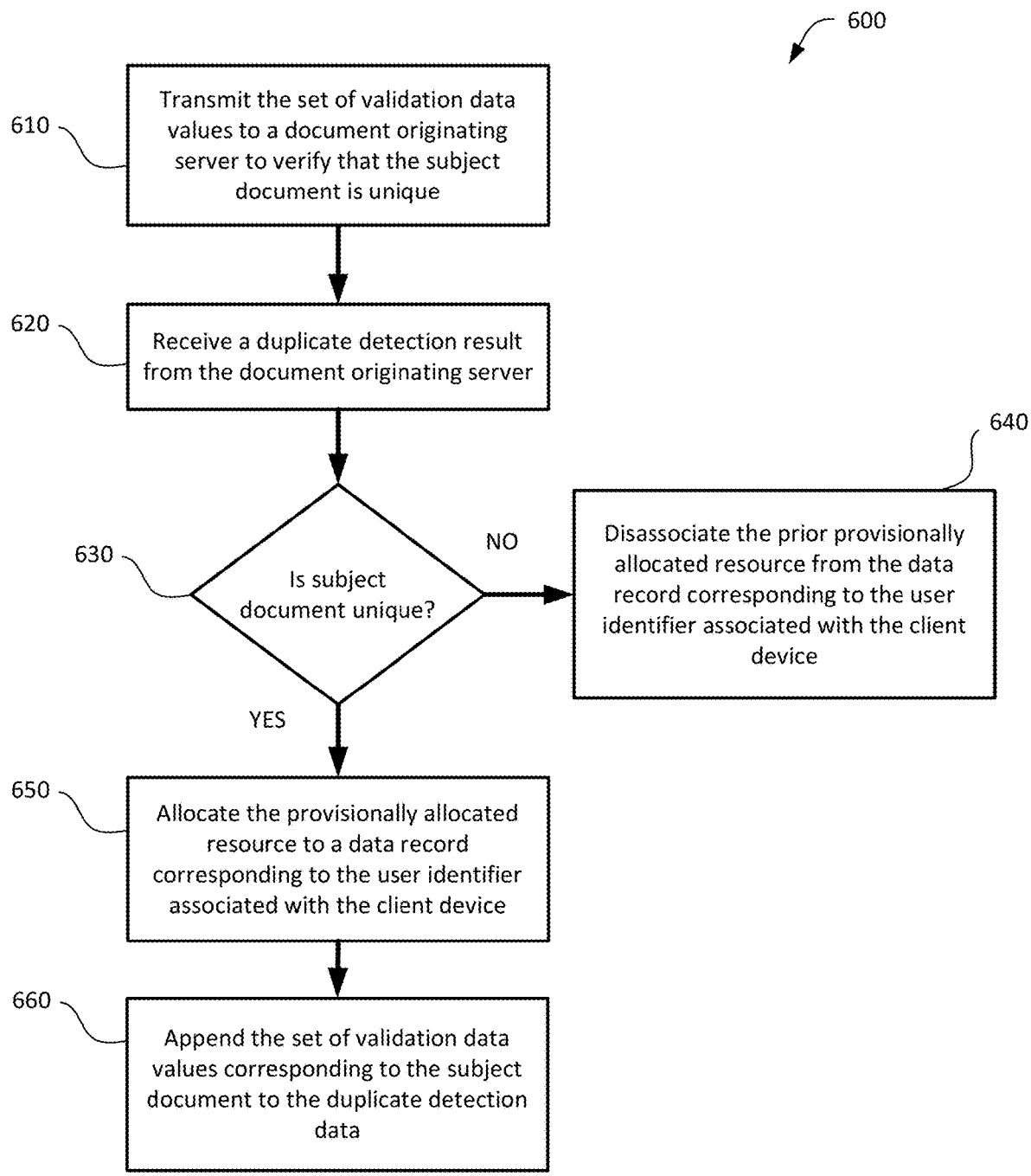
FIG. 6 illustrates, in flowchart form, a method of managing a subject document associated with a resource, in accordance with another example of the present application.

Reference is made to FIG. 6, which illustrates, in flowchart form, a method 600 of managing a subject document associated with a resource, in accordance with an example of the present application. The method 600 includes operations that may be carried out by one or more processors of the document receiving server 120 (FIG. 1). For example, the method 600 can be implemented, at least in part, through processor executable instructions associated with the document management application 122 (FIG. 1). In some examples, one or more operations may be implemented via processor executable instructions in other applications or in an operating system stored and executed on the document receiving server 120. In some examples, operations of method 600 can be conducted subsequent to operation 480 of FIG. 4.

At operation 610, the processor transmits the set of validation data values to the document originating server 130 (FIG. 1) for verifying whether the subject document is unique from the perspective of the document originating server. The set of validation values can include a combination of the obtained date, a portion of the document identifier, the obtained resource value, or other data values associated with the subject document. In some examples, operation 610 corresponds to operation 324 of FIG. 3.

At operation 620, the processor receives a duplicate detection result from the document originating server 130.

At operation 630, the processor determines whether the duplicate detection result provides an indication that the subject document is unique or that the subject document is not unique. When the processor determines that the duplicate detection result (from operation 620) indicates that the resource value associated with the subjected subject document has already been transferred, the processor, at operation 640, disassociates the prior provisionally allocated resource from the data record corresponding to the user identified associated with the client device 110. That is, when the processor determines that the submitted subject document is a double deposit, the processor, at operation 650, updates the client record associated with the payee entity to reflect that no deposit has been made.

Conversely, when the processor determines that the duplicate detection result indicates that the resource value associated with the submitted subject document has not been transferred (e.g., subject document is unique and not a "double deposit"), the processor, at operation 650, allocates the provisionally allocated resource to a data record corresponding to the user identifier associated with the client device 110. Recall that the document receiving server 120 may have provisionally allocated resource to a data record corresponding to a data record at operation 480. Thus, when the processor receives confirmation that the subject document is unique, the processor, at operation 650, finalizes the allocation of resources associated with the subject document to a client record corresponding to the payee entity.

Further, when the processor receives confirmation that the subject document is unique, the processor, at operation 660, appends the set of validation data values corresponding to the subject document to the duplicate detection data 126 (FIG. 1). By appending the set of validation data values corresponding to the subject document that is confirmed to be unique, the duplicate detection data 126 is augmented with data values for identifying a subsequent submission of that particular subject document.

The set of validation data values corresponding to the subject document may include the obtained date, the MICR data, and the resource amount (e.g., $456.58) of the cheque document illustrated in FIG. 2. Once, the set of validation data values are appended to the duplicate detection data 126, the processor may identify a subsequent transmission of an image of the cheque document illustrated in FIG. 2 as a double deposit.

For example, after the set of validation data values are appended to the duplicate detection data 126, the document receiving server 120 may receive an image of a subsequent document (e.g., a subsequent image of the cheque document illustrated in FIG. 2). In the present example, the subsequent document may correspond to the previously deposited subject cheque document. The document receiving server 120 may extract a subsequent identifier from the image of the subsequent document and obtain a date associated with the subsequent document. Further, the document receiving server may determine that the subsequent document is duplicate by comparing a set of subsequent data values with the duplicate detection data. As the image of the subsequent document illustrates the same cheque document as a prior submitted image of the subject document (e.g., cheque document of FIG. 2), the document receiving server 120 may determine that the set of subsequent data values (e.g., date, resource value, MICR data in image of subsequently received subject document) corresponds to the prior set of validation data values (e.g., date, resource value, MICR data in image of prior received subject document found to be unique).

When the set of subsequent data values is determined to correspond to the set of validation data values, the document receiving server 120 transmits, to the client device 110, a provisional decline notification. The provisional decline notification can include a textual message informing the payee entity that the submitted image of the subject document appears to be a "double deposit". In some examples, the provisional decline notification can further suggest that the payee entity visit a brick-and-mortar location in the event that the payee entity believes that identification of the "double deposit" is erroneous.

As receiving a response from the document originating server 130 regarding whether a resource transfer associated with a subject document had previously occurred may be subject to processing latency, the described operations at the document receiving server 120 provide real time, or near real time, indications on whether a subject document associated resource is likely being double deposited at the document receiving server 120.

Figure 7:
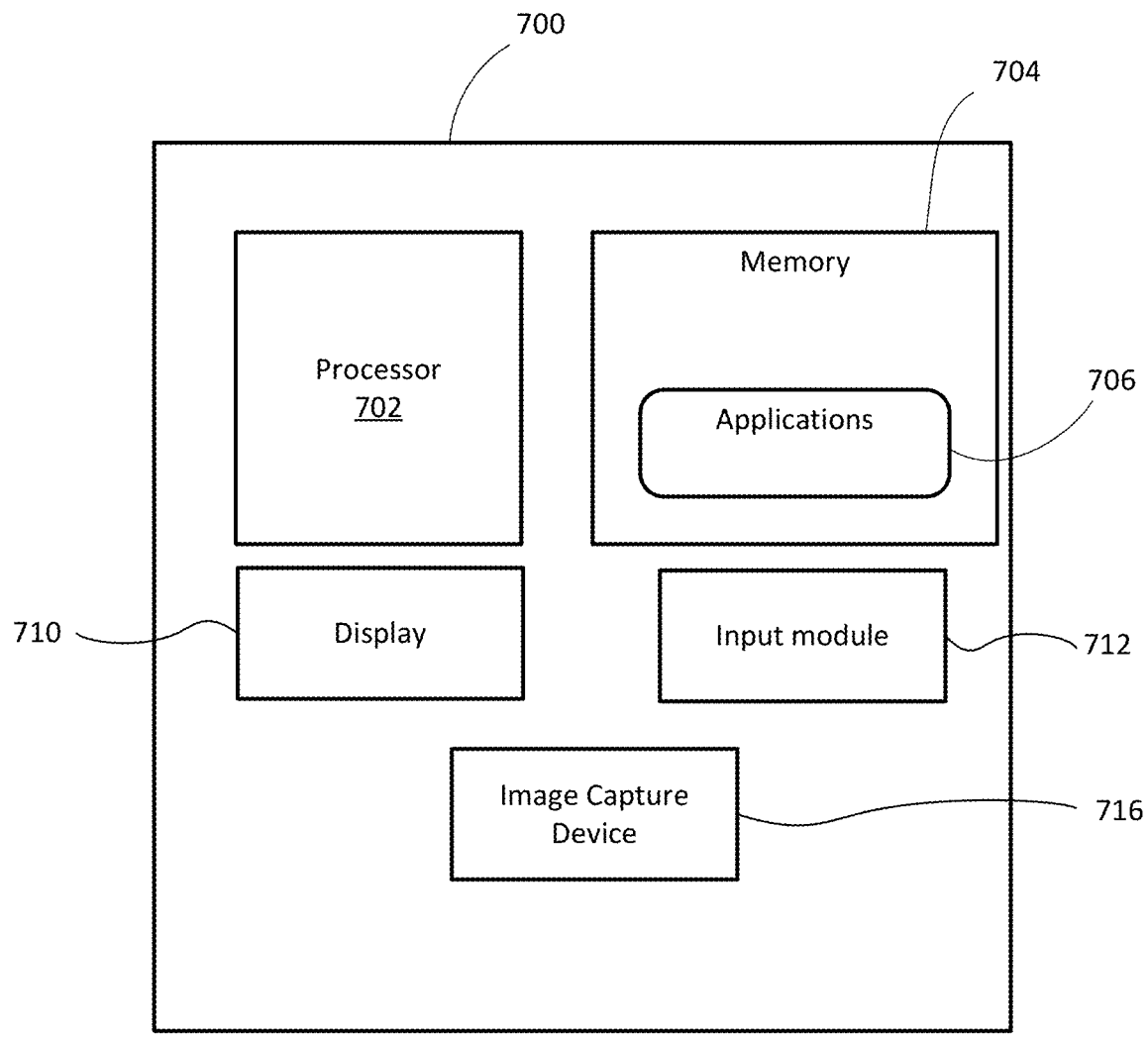
FIG. 7 illustrates, in simplified block diagram form, an electronic device, in accordance with an example of the present application.

Reference is made to FIG. 7, which illustrates, in simplified block diagram form, an electronic device 700, in accordance with an example of the present application. The electronic device 700 can be the client device 110 of FIG. 1. The electronic device 700 includes one or more processors 702, memory 704, and a communications module for providing network capabilities to communicate with other computing devices. The memory 704 can store processor executable software applications 706 that include an operating system to provide basic device operations. The software applications 706 may also include instructions implementing operations of the methods described herein.

The electronic device 700 includes a display interface and/or a display 710. The display 710 can be any suitable display such as a liquid crystal display (LCD), an e-ink/e-paper display, or the like. In some examples, the display 710 is a touchscreen display. The electronic device 700 includes an input module 712 for receiving signals representing commands described in examples herein. In some examples, the electronic device 700 is a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein. The electronic device 700 may be associated with one or more users who may interact with the electronic device 700 using the input module 712. In some examples, the display 710 and the input module 712 may correspond to the input/output module 114 of FIG. 1. The user may operate the electronic device 700 by way of a provided graphical user interface whereby the electronic device 700 performs one or more operations consistent with the examples described herein. In some examples, the electronic device 700 also includes an image capture device 716. The image capture device 716 can correspond to the image capture device 116 of FIG. 1 for capturing images of subject documents, as described herein.

Figure 8:
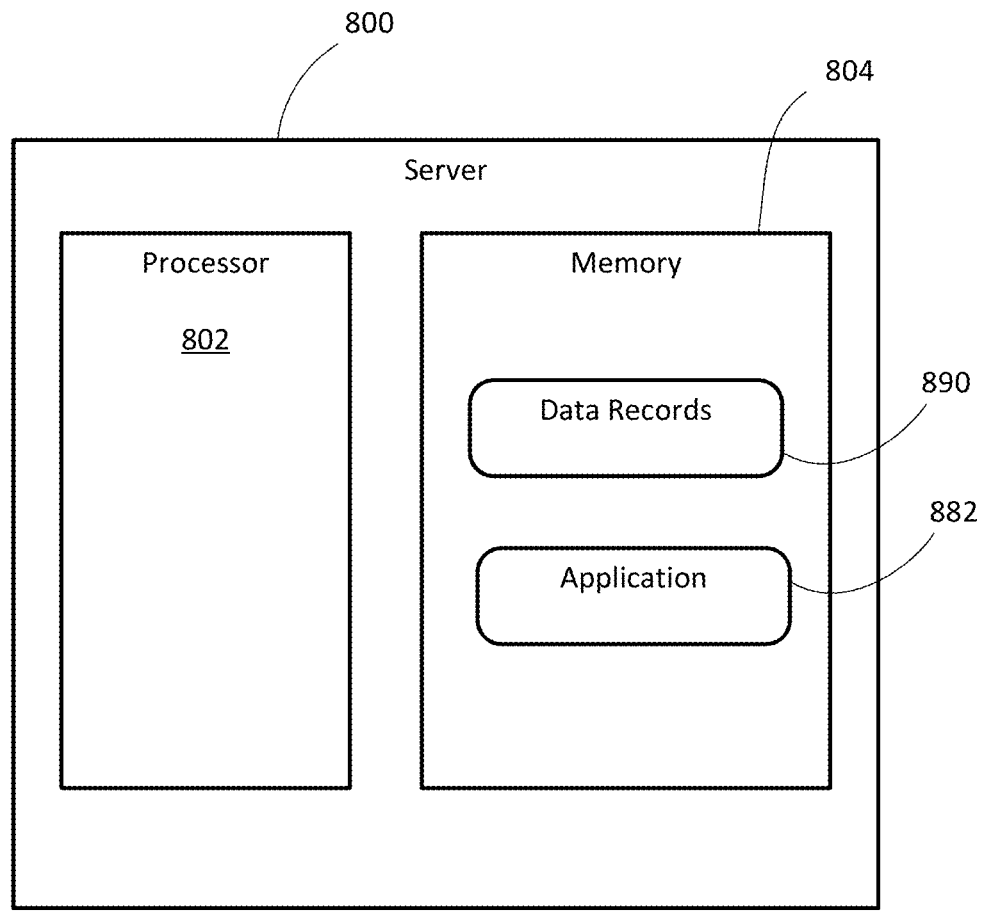
FIG. 8 illustrates, in simplified block diagram form, a server, in accordance with an example of the present application.

Reference is made to FIG. 8, which illustrates, in simplified block diagram form, a server 800, in accordance with an example of the present application. The server 800 may be the document receiving server 120 or the document originating server 130 of FIG. 1. The server 800 includes one or more processors 802, memory 804, and a communications module for providing network capabilities to communicate with other computing devices. The memory 804 may include data records 890. In an example of the document receiving server 120, the data records 890 can include the client record data 124 and/or the duplicate detection data 126. In an example of the document originating server 130, the data records 890 can be the issued document records 134 of FIG. 1.

The memory 804 can also include applications 882 having instructions for performing the operations described herein. In an example of the document receiving server 120, the applications 882 can include the document management application 122 of FIG. 1. In an example of the document originating server, the applications 882 can include the document verification application 132 of FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A system for managing a subject document associated with a resource, the system comprising:
   a communication module;
   a processor coupled to the communication module; and
   a memory coupled to the processor, the memory storing instructions that, when executed, configure the processor to:
      receive an image of the subject document;
      extract document data from the image of the subject document;
      receive a date obtained by user input via an input module;
      extract a date from the image of the subject document;
      determine that the subject document is unique by:
         comparing a first set of validation data values including the date obtained by user input and at least a portion of the extracted document data to duplicate detection data;
         comparing a second set of validation data values including the date extracted and at least a portion of the extracted document data to the duplicate detection data; and
         determining that the first set of validation data values and the second set of validation data values are distinct from respective transaction entries of the duplicate detection data;
   and
      in response to determining that the subject document is unique:
         provisionally allocate the resource associated with the subject document to a data record.

2. The system of claim 1, wherein the duplicate detection data is non-image data.

3. The system of claim 1, wherein the instructions, when executed, further configure the processor to receive a resource amount obtained via an input module, and wherein the first and second sets of validation data values further includes the obtained resource amount.

4. The system of claim 1, wherein the instructions, when executed, further configure the processor to determine that the subject document is unexpired based on a timestamp of the image of the subject document and a document expiry date, the document expiry date being calculated based on the date obtained by user input associated with the subject document and an expiry period.

5. The system of claim 4, wherein the instructions, when executed, further configure the processor to purge at least one data entry in the duplicate detection data that is older than the expiry period.

6. The system of claim 1, wherein the instructions, when executed, further configure the processor to:
transmit the first and second sets of validation data values to a document originating server to verify that the subject document is unique; and
receive confirmation that the subject document is unique and, in response, allocate the provisionally allocated resource to the data record.

7. The system of claim 6, wherein the instructions, when executed, further configure the processor to:
receive, an image of a subsequent document;
extract a subsequent identifier from the image of the subsequent document;
obtain by user input via an input module a subsequent date associated with the subsequent document;
extract a subsequent date from the image of the subsequent document;
determine that the subsequent date obtained by user input is different than the subsequent date extracted;
in response to determining that the subsequent date obtained by user input is different than the subsequent date extracted, determine that the subsequent document is a duplicate by:
comparing a first set of subsequent data values including the subsequent date obtained by user input and at least a portion of the extracted subsequent identifier with the duplicate detection data;
comparing a second set of subsequent data values including the subsequent date extracted and at least a portion of the extracted subsequent identifier with the duplicate detection data; and
determining that the first set of subsequent data values correspond to respective transaction entries of the duplicate detection data;
and
in response to determining that the subsequent document is a duplicate, transmit, a provisional decline notification.

8. The system of claim 1, wherein the resource includes at least one of currency, tokens, or digital assets.

9. The system of claim 1, wherein the subject document is a cheque instrument directing a banking institution to transfer value to a payee entity of the cheque instrument, and wherein the document data is provided as a machine-readable indicium included in the subject document.

10. A computer-implemented method of managing a subject document associated with a resource, the method comprising:
receiving an image of the subject document;
extracting a document data from the image of the subject document;
receiving a date obtained by user input via an input module;
extracting a document date from the image of the subject document;
determining that the subject document is unique by:
comparing a first set of validation data values including the date obtained by user input and at least a portion of the extracted document data to duplicate detection data;
comparing a second set of validation data values including the date extracted using and at least a portion of the extracted document data to the duplicate detection data; and
determining that the first set of validation data values and the second set of validation data values are distinct from respective transaction entries of the duplicate detection data; and
in response to determining that the subject document is unique:
provisionally allocating the resource associated with the subject document to a data record.

11. The method of claim 10, wherein the duplicate detection data is non-image data.

12. The method of claim 10, further comprising: receiving a resource amount obtained via an input module, and wherein the first and second sets of validation data values further includes the obtained resource amount.

13. The method of claim 10, further comprising determining that the subject document is unexpired based on a timestamp of the image of the subject document and a document expiry date, the document expiry date being calculated based on the date obtained by user input associated with the subject document and an expiry period.

14. The method of claim 13, further comprising purging at least one data entry in the duplicate detection data that is older than the expiry period.

15. The method of claim 10, further comprising:
transmitting the first and second sets of validation data values to a document originating server to verify that the subject document is unique; and
receiving confirmation that the subject document is unique and, in response, allocate the provisionally allocated resource to the data record.

16. The method of claim 15, further comprising:
receiving an image of a subsequent document;
extracting a subsequent identifier from the image of the subsequent document;
obtaining, by user input via an input module, a subsequent date associated with the subsequent document;
extracting a subsequent date from the image of the subsequent document;
determining that the subsequent date obtained by user input is different than the subsequent date extracted;
in response to determining that the subsequent date obtained by user input is different than the subsequent date extracted, determining that the subsequent document is a duplicate by:
comparing a first set of subsequent data values including the subsequent date obtained by user input and at least a portion of the extracted subsequent identifier with the duplicate detection data;
comparing a second set of subsequent data values including the subsequent date extracted and at least a portion of the extracted subsequent identifier with the duplicate detection data; and
determining that the first set of subsequent data values correspond to respective transaction entries of the duplicate detection data; and
in response to determining that the subsequent document is a duplicate, transmitting, a provisional decline notification.

17. The method of claim 10, wherein the resource includes at least one of currency, tokens, or digital assets.

18. The method of claim 10, wherein the subject document is a cheque instrument directing a banking institution to transfer value to a payee entity of the cheque instrument, and wherein the document data is provided as a machine-readable indicium included in the subject document.

19. A non-transitory computer-readable storage medium storing instructions for managing a subject document associated with a resource, the instructions, when executed by a processor of a system, cause the system to:

obtain an image of the subject document;
extract document data from the image of the subject document;
receive a date obtained by user input via an input module;
extract a date from the image of the subject document;
determine that the subject document is unique by:
- comparing a first set of validation data values including the date obtained by user input and at least a portion of the extracted document data to duplicate detection data;
- comparing a second set of validation data values including the date extracted and at least a portion of the extracted document data with the duplicate detection data; and
- determining that the first set of validation data values and the second set of validation data values are distinct from respective transaction entries of the duplicate detection data;

and
in response to determining that the subject document is unique:
- provisionally allocate the resource associated with the subject document to a data record.

20. The system of claim 1, wherein extracting the date from the image of the subject document includes using image recognition, wherein the image recognition includes optical character recognition.

\* \* \* \* \*